H. KUEHN.
SAW SET.
APPLICATION FILED APR. 25, 1921.
1,425,389.
Patented Aug. 8, 1922.
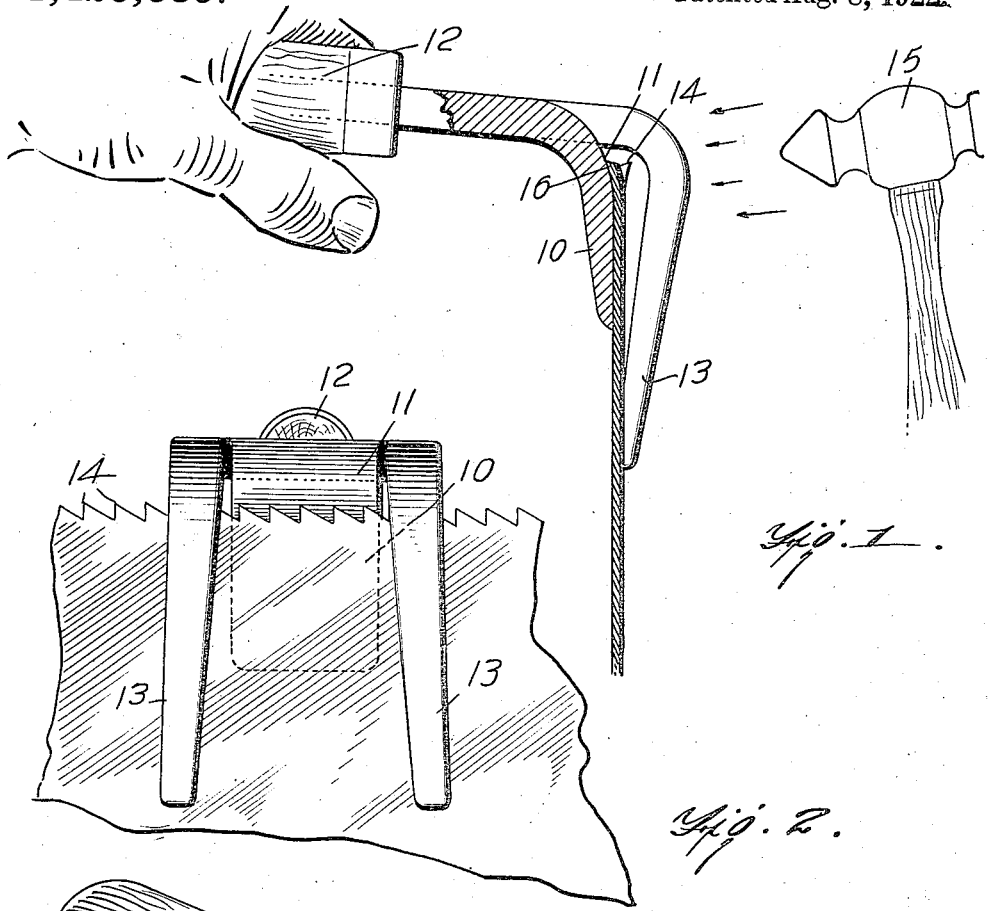
Fig. 1.
Fig. 2.
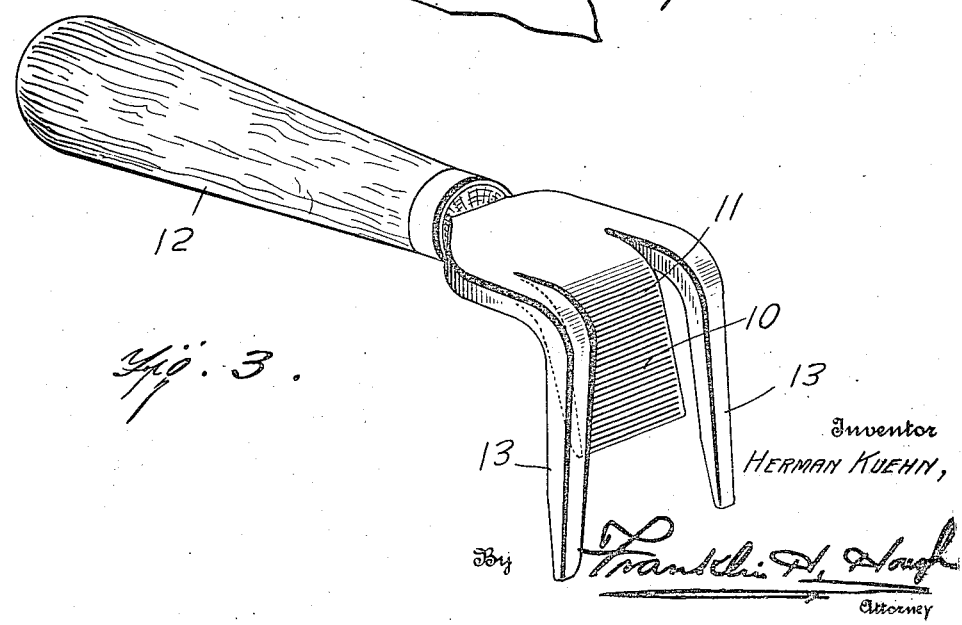
Fig. 3.
Inventor
HERMAN KUEHN,
By Franklin H. Hough
Attorney

UNITED STATES PATENT OFFICE.

HERMAN KUEHN, OF NEW AUBURN, WISCONSIN.

SAW SET.

1,425,389.  Specification of Letters Patent.  Patented Aug. 8, 1922.

Application filed April 25, 1921. Serial No. 464,180.

*To all whom it may concern:*

Be it known that I, HERMAN KUEHN, a citizen of the United States, residing at New Auburn, in the county of Chippewa and State of Wisconsin, have invented certain new and useful Improvements in Saw Sets, of which the following is a specification, reference being had therein to the accompanying drawings.

This invention relates to saw sets and has for an object to provide a device adapted to be used with saws of any cut or pitch of teeth, and to provide a universal set for all saws.

A further object of the invention is to provide an anvil having improved means for holding it in proper engagement with a saw so that the teeth of the saw may be struck by a hammer to upset them from planar relation with the saw blade to the proper angularity.

A further object of the invention is to provide an anvil having an inclined portion increasing in its inclination, with fingers for engaging the side of the saw blade opposite the anvil for holding the anvil in proper relation with the saw and teeth.

With these and other objects in view the invention comprises certain novel elements, parts and combinations, as shown in the drawing, together with equivalents thereof, as will be hereinafter more fully described and claimed.

In the drawings:

Figure 1 is a view of the device in position upon a saw with a hammer in position to strike a tooth, one of the retaining fingers being broken away to show the position of the anvil relative to the saw;

Figure 2 is a view of the device in front elevation as it appears upon a saw, and Figure 3 is a view of the device in perspective.

Like characters of reference indicate corresponding parts throughout the several views.

The improved saw set which forms the subject matter of this application comprises an anvil 10 of any approved size and thickness, whereby resistance to impact is provided, having also a curved inclined surface 11. A handle 12 serves the operator in holding the anvil 10 against the side of the saw and spaced fingers 13 are provided which will engage the side of the saw opposite the anvil 10, as shown more particularly at Figures 1 and 2.

The device as an entirety may be moved upwardly or downwardly relative to the teeth 14 of the saw, whereby a greater or lesser portion of the inclined shoulder 11 is brought into use. When properly positioned so that the tooth 14 will be given the proper inclination when forced against the inclined portion 11, the tooth is struck by the hammer 15. The striking of the tooth will force the tooth into engagement with the anvil and into engagement with the inclined shoulder whereby it will be forced over to the position shown at 16 in Figure 1. Alternate teeth will be struck successively and the anvil moved longitudinally along the saw until alternate teeth have been bent in one direction, whereupon the device will be moved to the opposite side of the blade and the teeth intermediate those already bent will be likewise struck and bent in the direction opposite the bending of the first teeth, providing the necessary clearance and setting of the several teeth.

What I claim to be new is:

1. A saw set comprising an anvil member and means for retaining the saw against the anvil member, the anvil member provided with a plane face for the saw blade and an anvil surface for the saw teeth, the anvil surface receding from the plane face with an increasing angularity relative to the plane face.

2. A saw set comprising a shank, a tongue projecting downward from the shank and serving as an anvil, fingers carried by the shank and projecting beyond the anvil tongue.

In testimony whereof I hereunto affix my signature in presence of two witnesses.

HERMAN KUEHN.

Witnesses:
WM. TRUMP,
OTTO KUEHN.